United States Patent [19]

Murch et al.

[11] 4,365,025

[45] Dec. 21, 1982

[54] FLEXIBLE POLYURETHANE FOAMS FROM POLYMETHYLENE POLYPHENYL ISOCYANATE CONTAINING PREPOLYMERS

[75] Inventors: Robert M. Murch, Brinklow; Louis L. Wood, Rockville, both of Md.

[73] Assignee: W. R. Grace & Co., New York, N.Y.

[21] Appl. No.: 328,478

[22] Filed: Dec. 8, 1981

[51] Int. Cl.$^3$ .................................................. C08G 18/14
[52] U.S. Cl. .................................... 521/159; 521/905; 521/914; 528/66; 528/67
[58] Field of Search ...................... 521/159, 905, 914; 528/66, 67

[56] References Cited

U.S. PATENT DOCUMENTS

| | | | |
|---|---|---|---|
| 2,683,730 | 7/1954 | Seeger et al. ...................... | 260/453 |
| 4,137,200 | 1/1979 | Wood et al. ...................... | 521/159 |
| 4,165,411 | 8/1979 | Marans et al. .................... | 521/107 |
| 4,237,240 | 12/1980 | Jarre et al. ....................... | 521/159 |
| 4,292,412 | 9/1981 | Wood ................................. | 521/159 |

OTHER PUBLICATIONS

Technical Service Report of the Upjohn Polymer Chemicals Company on "Cast Elastomers and RIM Processing: The MDI Bridge".
"Encyclopedia of Polymer Science and Technology", vol. 11, Polyurethans and Flexible Foams, p. 538.

*Primary Examiner*—Maurice J. Welsh
*Attorney, Agent, or Firm*—Edward J. Cabic; Richard P. Plunkett; William W. McDowell, Jr.

[57] ABSTRACT

Flexible polyurethane foams are made from isocyanate containing prepolymers where the isocyanate is a mixture of diphenylmethane diisocyanate (MDI) and polymeric forms of MDI. The isocyanate mixture has a functionality greater than 2.0. The prepolymer is an isocyanate capped polyol or mixture of polyols where the polyols are diols or triols having at least 50% by weight oxyethylene groups. The foams are made by reacting water with the prepolymer and fire retardant materials can be added to the reaction mixture to produce fire retardant foams. The foams have improved physical properties and flammability resistance.

25 Claims, No Drawings

FLEXIBLE POLYURETHANE FOAMS FROM POLYMETHYLENE POLYPHENYL ISOCYANATE CONTAINING PREPOLYMERS

BACKGROUND OF THE INVENTION

1. Field of the Invention

This invention relates to a new polyurethane prepolymer and foam compositions and to methods of preparing these materials.

2. Description of the Previously Published Art

Flexible polyurethane foams have been made from prepolymers that have their ends capped with an isocyanate. The preferred commercially used isocyanate for capping is tolylene diisocyanate, TDI, which is also known as toluene diisocyanate. These isocyanate capped prepolymers are reacted with water to form flexible foams. An example of this prepolymer system is described in the Wood et al U.S. Pat. No. 4,137,200.

When utilizing this prepolymer foam making system it is also possible to add a large quantity of fire retardant materials to the aqueous phase. The resulting polyurethane foams are fire resistant because of the composition of the polyurethane and because they contain large amounts of fire retardant materials. Such a system is disclosed in the Marans et al U.S. Pat. No. 4,165,411.

These two patents list many isocyanates other than TDI for capping the prepolymers and included in the list is PAPI a commercially available polymerized form of methylene diphenyl isocyanate, MDI, as defined in U.S. Pat. No. 2,683,730. However, in all of the examples in both of the Wood et al and Marans et al patents the preferentially used isocyanate is tolylene diisocyanate, TDI if a flexible foam is desired since the polymerization of polymeric MDI results in rigid foams.

When flexible polyurethane foams are desired which are made from an isocyanate it has been the understanding that TDI is to be used as the isocyanate since MDI type isocyanates are generally only used for making rigid foams. See, for example, the discussion of an MDI application grid in the Technical Service Report of the Upjohn Polymer Chemicals Company on "Cast Elastomers and RIM Processing: The MDI Bridge" where they point out the entire grid can be formulated with MDI-type isocyanates with the exception of flexible cushioning and some refrigeration applications. In other words, the MDI is not capable, in the opinion of the manufacturer, to be used for flexible foams. Similarly, the "Encyclopedia of Polymer Science and Technology", Vol. 11 (John Wiley and Sons, Inc. 1969) in the section on flexible polyurethane foams at page 538 also shows that MDI is not used in flexible foams with the following statement. "Although various diisocyanates have been used in preparing flexible foams, for all practical purposes, tolylene diisocyanate (TDI) is used almost exclusively. The 80:20 mixture of 2,4- and 2,6-isomers is most commonly used commercially in the United States."

For polyurethane foams made by the prepolymer system where a prepolymer is first formed by capping each end of a polyol with at least a difunctional isocyanate, TDI has been the preferred material to use as the isocyanate, TDI has been the preferred material to use as the isocyanate. One reason for the use of TDI is because it permits excellent control in the initial reaction with the polyol. The isocyanate group adjacent the methyl moiety in TDI is sterically hindered and has a lower reactivity than the isocyanate group in the para position. When making the prepolymer essentially only the isocyanate group in the para position initially reacts with the polyol leaving the isocyanate group in the ortho position to react later when the prepolymer is foamed by mixing with water. Such a controlled, sequential reactivity of the two isocyanate groups was not expected to be possible with MDI since it has two isocyanate groups at symmetrical locations with each one having the same reactivity. Thus one would expect it would be difficult to control the reactivity of the isocyanate groups when making the MDI prepolymer and that uncontrolled chain extension would take place. Similarly, when using a polymeric MDI having a functionality greater than 2.0 to make a prepolymer, one would expect there would be excessive crosslinking because of the extra isocyanate groups.

Although TDI containing foams are the current material of choice for making flexible polyurethane foams from isocyanate capped prepolymers, they do have three disadvantages. One is that in these foams the TDI can form TDA, tolylene diamine, and this material is considered to be a potential carcinogenic material. Thus, for health reasons it would be preferred to use a polyurethane foam which does not contain TDI. Another is that TDI itself is a relatively volatile, low boiling, high vapor pressure monomer that causes problems with the health of workers who are exposed to these vapors in the foam production operations. The third disadvantage is that the TDI containing foams made from the polyols described in the Wood et al U.S. Pat. No. 4,137,200 do not have good hydrolytic stability which is a measure of the resistance to wet aging and a measure that would be predictive of the rate of degradation in a wet environment.

3. Objects of the Invention

It is an object of this invention to produce a flexible polyurethane prepolymer and foam which does not contain TDI, which promotes improved safety to workers, and which has even better compression set and hydrolytic stability.

It is a further object to produce a polyurethane foam from a prepolymer which has as the major source of the isocyanate in the prepolymer a polymeric MDI isocyanate.

It is a further object of the invention to produce a polyurethane prepolymer which has a polymeric MDI as its major isocyanate component.

It is a further object to produce fire retardant polyurethane foams which contain polymeric MDI as the major isocyanate component of the prepolymer and which have good compression set, good hydrolytic stability, lower smoke generation, and which will generate less toxic products on burning.

It is an object to produce polymeric MDI containing flexible foams with compression set values of less than 25% and preferably less than 20%.

These and further objects will become apparent as the description of the invention proceeds.

SUMMARY OF THE INVENTION

Flexible polyurethane foams having excellent low compression set values, having good hydrolytic stability, having low smoke generation and generating less toxic products on burning are produced from prepolymers that are capped with a polymeric MDI as the major source of isocyanate. These foams have compression set values which are less than 25% and preferably even less than 20% and when subjected to hydrolytic aging they still retain these generally low compression set values. The prepolymers can be mixed with aqueous solutions containing large amounts of fire retardant additives to produce fire retardant polyurethane foams which have better fire retardant properties than TDI foams when measured by the Oxygen Index standard. These fire retardant foams also have good compression set values, good hydrolytic stability, low toxicity when burned, and low smoke generation when burned. Among the preferred polymeric MDI isocyanates are the PAPI family made by Upjohn Polymer Chemicals such as PAPI 135, PAPI 901 or Code 094 (also known as PAPI 94).

The isocyanate-capped prepolymer can be made from a polyol having at least about 50% by weight of oxyethylene groups. The polyol is preferably a diol or a triol having nominally two or three hydroxyl equivalents per mole or it can be a mixture of polyols which would have nominally two to three hydroxyl equivalents per mole. The polyisocyanate to cap the polyol is added so that the ratio of the isocyanate equivalents to the total hydroxyl equivalents is in the range of 1.5:1 to 5:1. When the amount of isocyanate equivalents per mole of polymeric MDI is greater than 2 the reaction product will be cross-linked with the additional urea linkages formed between the reacting isocyanate groups. In other words, when the functionality of the polyisocyanate is greater than 2 the crosslinking will contain urea linkages.

DETAILED DESCRIPTION OF THE INVENTION

By the use of polymeric MDI as the isocyanate capping material for polyether polyols, unique prepolymers have been made which when reacted with water will form surprisingly unexpected flexible foams having good compression set and hydrolytic stability. When mixing the prepolymers with water, further fire retardant powders can be added in large amounts to produce a resulting fire retardant foam that is highly fire resistant when measured by the Oxygen Index standard.

The superiority in compression set for the foams made from the prepolymers of this invention is quite unexpected when compared to TDI containing prepolymers from an identical polyol or combination of polyols.

The polyisocyanate used for capping the polyol is a polymeric MDI isocyanate. These materials are commercially available and usually are sold as a mixture of MDI which has an isocyanate functionality of 2.0 and a polymerized form of MDI which is a polymethylene polyphenylisocyanate where the system is represented by the formula

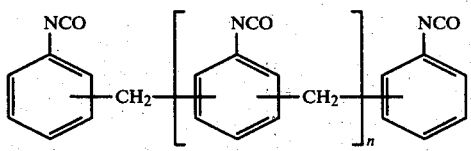

where n is from about 0 (i.e. generally MDI when para-oriented) to 3. As manufactured by Upjohn Polymer Chemicals they are sold under the tradename PAPI and include PAPI 135 which has an average functionality of abut 2.7, PAPI 901 which has an average functionality of about 2.3 and CODE 094 (PAPI 94) which has an average functionality of about 2.2. Similar materials are sold by Mobay Chemical Corporation under the Mondur tradename.

The prepolymers are made by capping polyols with the isocyanate. Desirable polyols are diols or triols having about 50% by weight or more of oxyethylene groups. Among the diols are polyethylene glycol (PEG) type diols having molecular weights from about 200 to 6,000 and preferably 400 to 4,500. In addition to the polyoxyethylene containing diol, a polyol mixture can be used further containing a triol such as trimethylolpropane (TMOP) or another diol such as 1,4-butanediol. Triols with large amounts of polyoxyethylene groups are also useful as the starting polyol for the prepolymer.

As indicated above, the polyol preferably has at least about 50% by weight oxyethylene groups to provide optimum properties. When a mixture of polyols is used, then again 50% by weight of the total polyol weight will preferably be made of oxyethylene groups.

Various types of fire-retardants and/or intumescent materials can be incorporated into the protective foam. Most of the materials are first suspended or dissolved in the aqueous phase to form the slurry or solution and then the prepolymer is mixed with the slurry. The amount of materials to be added to the water can vary from about 10 parts of material per 100 parts of water up to about 300 parts of material per 100 parts of water. If concentrations are employed below the lower amount, there may not be enough fire-retardant or intumescent material present in the resulting foam. On the other hand, if more material is added to the water than the upper specified amount, then a thick paste will form which will not mix well with the prepolymer. This discussion on the amount of additives is based on materials having a relatively low density such as a specific gravity of around 3, as possessed by alumina trihydrate. Of course, if much heavier particles are employed, such as lead, having a specific gravity of 11.3, then larger amounts by weight could be added to the aqueous slurry before a limiting thick paste is obtained. Some of the materials, such as the liquid organic phosphates to be discussed below, can initially be mixed with the prepolymer instead of being added to the aqueous slurry or solution.

Broad classes of preferred materials include alumina trihydrate, Al(OH)$_3$; polyammonium phosphates; borate salts; alkyl borates; starch or cellulose; wood pulp; halogen containing materials; heavy metal oxides or salts; etc. H. Z. Vandersall describes many materials used in intumescent paint chemistry in *Journal of Fire and Flammability*, 2, 87(1971). Vandersall lists four categories for classifying components of intumescent systems as (1) an inorganic acid or a material yielding acid at temperatures between 100° and 250° C., (2) a polyhydric material rich in carbon, (3) an organic amine or amide, and (4) a halogenated material. Most formulations that depend on intumescence contain an example of each although, in some cases, two or more functional groupings are included in a single component.

Inorganic acid sources include acids such as phosphoric, sulfuric and boric; ammonium salts such as ammonium phosphate, ammonium monophosphate, ammonium diphosphate, ammonium polyphosphate, ammonium sulfate and ammonium halides; amine and amide phosphates such as urea phosphate, guanyl urea phosphate, melamine phosphate, polyphosphorylamide, phosphoryl trianilide, and reaction products of $NH_3$ and $P_4O_{10}$; amine sulfates such as p-nitroaniline bisulfate; and organophosphorous compounds such as tricresyl phosphate, alkyl phosphates; and haloalkyl phosphates such as tris(2,3 dibromopropyl)phosphate and tris($\beta$-chloroethyl)phosphate.

Polyhydric materials include starch; dextrin; sorbitol; pentaerythritol and its dimers and trimers; resorcinol; phenolics; triethylene glycol; methylol melamine; isano oil; and linseed oil.

Amine and amide compounds include urea, urea:H-CHO, butyl urea, dicyandiamide, benzene sulfonylhydrazide, melamine, aminoacetic acids such as glycine, casein, polyamide resins and wool flock.

Halogenated compounds include chlorinated paraffins, chlorinated rubber, parachlorometaxylenol, tetrachlorophthalic resins and pentachlorophenyl glyceryl ether or their bromo counterparts.

For non-intumescent additive systems from about 50 to about 400 parts of alumina trihydrate can be used and preferably from about 100 to about 275 parts per 100 parts of water. In the case where 100 parts of polyurethane prepolymer are mixed with 100 parts of the water, then the amount of alumina trihydrate employed is from about 50 to about 400 parts per 100 parts by weight of the polyurethane. Satisfactory alumina trihydrate (also called hydrated alumina or alumina hydrate) is highly refined, inorganic white granular crystalline powder with the $Al_2O_3.3\ H_2O$, chemical formula of which is also frequently written as $Al(OH)_3$. Such material is produced by the Bayer process from bauxite ore and may contain small amounts of soda, iron oxide and silica. Suitable alumina trihydrates as described above are chemically inert and frequently are employed as inert fillers. Generally, the alumina trihydrate is employed in particulate form, optionally with a surface treatment to enhance processability and the like, with an average particle size of from about 0.5 to about 120 microns. Particles of about 5 to about 20 microns are particularly useful.

The phosphorous-containing additive is employed at levels of from about 1 to about 40 parts by weight per 100 parts of water, and preferably at about 5 to about 20 parts. Suitable phosphorous-containing compounds include phosphites, polyphosphites, ammonium phosphates such as Phoschek P/30 made by Monsanto, polyphosphates, phosphate salts, organic phosphates, phosphonates and polyphosphonates and mixtures thereof. Additional phosphorous compounds are more fully described in U.S. Pat. No. 4,066,578, incorporated herein by reference.

The carbon compound employed must have an OH/C mole ratio of at least 0.1:1 and preferably from about 0.3:1 to about 0.8:1. The carbon compound must also be water-dispersible to the extent that it is either soluble or miscible with water, or it can be dispersed in water with the aid of common surfactants so that the foam can be uniformly protected. In general, the total amount of the carbon compound employed should reach at least about 5 parts by weight to provide any benefit. However, if the amount of the carbon compound employed is too great, the flame-retardant contribution of the alumina/phosphorous compounds will be overcome. Therefore, the upper limit on the amount of carbon compound employed is about 30 parts by weight. Preferably from about 10 to about 25 parts are employed. When using wood cellulose a lower amount can be employed from about 2 to 10 parts with a preferred range of 4 to 5 parts.

Suitable carbon compounds include aliphatic alcohols having at least two hydroxyl groups per mole, and also include "aromatic" alcohols, i.e., phenols. Suitable aliphatic alcohols may be exemplified as follows: pentaerythritol, (mono-, di-, tripentaerythritol), methylene glycol, glycerine, polyvinyl alcohol, trimethylolpropane, erythritol, arabitol, triethanol amine and methylol melamine. Suitable saccharides include: starch, sorbitol, dextrin, fluor, cellulose (including wood cellulose and its ground form, known as wood flour), extracted Douglas Fir bark, mannitol, sucrose, inositol and arabinose. Suitable phenols, (i.e., aromatic hydroxyl compounds) include: resorcinol, lignin, hydroquinol, trimethylolbenzene, phyrogllol, catechol and phloroglucinol. If undue thickening action occurs in the aqueous phase through use of any of the above carbon compounds, the amount of the compound employed should be reduced to permit adequate processing.

If the present specification, and especially in the following description of the various components employed in the foams, reference to "parts" or "parts by weight" refers to parts by weight based on 100 parts by weight of the urethane prepolymer employed. The terms fire-retardant additives or fire-retardant fillers as used here and in the claims are to encompass also the intumescent materials discussed above.

Preparation of fire retardant foams according to the invention are illustrated in the examples. In one embodiment the process begins by dissolving or dispersing the aprotic phosphorous compound in the urethane prepolymer, although the phosphorous compound can be added to the water phase. The alumina hydrate and the carbon compound are dispersed in water. Subsequently the two phases are combined as a reactant mixture which can be sprayed to produce the foam. As described in U.S. Pat. No. 4,066,578 referred to above, a suspending agent for the alumina trihydrate is generally included in the aqueous phase. The use of such a surfactant is optional. The surfactant might be added in either the organic or aqueous phases to influence cell size or structure and it can be either a non-ionic, cationic or amphoteric surfactant. From about 0.1 to about 10 parts of the non-ionic suspending agent are employed, and from about 0.01 to about 10 parts of the non-ionic, cationic or amphoteric surfactant are employed.

Suitable non-ionic surfactants/suspending agents, often described as solution thickeners, include but are not limited to non-ionic cellulosic polymers such as hydroxyethyl cellulose polymers (e.g., Natrosol, such as Natrosol 250HH, by Hercules, or Cellosize by Union Carbide), hydroxypropyl cellulose (e.g., Klucel by Hercules), ethylhydroxyethyl cellulose (e.g., EHEC by Hercules), and ethyl cellulose. In addition to non-ionic cellulosic polymers, other appropriate non-ionic suspending agents include water-soluble polyoxyethylene polymers (e.g., Polyox by Union Carbide), gelatin, guar gum and agar. In addition anionic suspending agents can be used such as carboxy vinyl polymers of very high molecular weight (e.g. Carbopol 941 by B. F. Goodrich Chemical).

These suspending agents or solution thickeners are optional ingredients since the foam-forming materials could be initially formulated just prior to foaming. However, when the aqueous slurry is made in bulk and is being used over a period of days, then it is advantageous to add the suspending agent to maintain the large concentration of additives in suspension with little or no stirring required.

Examples of suitable amphoteric and cationic surfactants are set forth in U.S. Pat. No. 4,066,578, which has been incorporated by reference into the present application. Suitable non-ionic surfactants include sorbitan trioleate (e.g., Arlacel 85 by ICI), polyoxyethylene sorbitol oleate (e.g., Atlas G 1186 by ICI), polyoxyethylene sorbitan monolaurate (e.g., Tween 21 by ICI), polyoxyethylene lauryl ether (e.g., Brij 30 by ICI), polyoxyethylene stearyl ether (e.g., Brij 72 by ICI), silicon glycol copolymer (Dow Corning 190), fluorochemical surfactants (e.g., Zonyl FSN by E. I. du Pont and Fluorad FC 170C by 3M), condensates of ethylene oxide and propylene oxide with propylene glycol (e.g., Pluronic L31, Pluronic L62, Pluronic L64, Pluronic P75 by BASF Wyandotte), and organosilicone surfactants (e.g., L520 by Union Carbide).

In addition, reinforcing agents can also be added to the mixture to improve the strength of the resulting foam. Many types of fibers can be used for this purpose, such as wood, carbon, glass, polyolefin, polyester, polyamide, cellulosic (which would include rayon), polyvinyl alcohol, polyvinyl chloride, and polyvinylidene chloride fibers; mineral wool; metal fibers; etc.

The fire-retardant polyurethane foams prepared by the invention have numerous advantages. Specifically, it is believed the chars are stronger and more resistant to removal as described earlier. Additionally, many of the foams, while containing appreciable quantities of particulate and normally "dusty" additives, are relatively non-dusty, especially in comparison to foams loaded to similar levels but not utilizing the invention. Additionally, the carbon compound employed along with the alumina trihydrate and phosphorous compounds exhibit good resistance to leaching. Foams prepared according to the invention are generally open celled and may be rigid, semi-rigid or flexible, depending upon the level of crosslinker and amounts and types of additives employed.

Production of the foam may be accomplished by bringing together the aqueous component and the prepolymer component by any suitable means which will insure complete mixing such as by mixing in a tank with a high-speed stirrer, by spraying, or by the use of conventional mixing and metering machinery of the polyurethane industry. The foaming mixture is preferably discharged into a form such as a mattress mold or free-rise box before the frothy mixture begins to rise, i.e. before is begins to increase in volume because of the action of the blowing gasses. If the mixture is not discharged soon enough, it will have developed sufficient crosslinking to stick to the mixing device. On the other hand, it must be mixed long enough to insure that the two components are mixed homogeneously. In most instances the carbon dioxide generated by the reaction of the isocyanate functionality with the water will be sufficient to cause the desired volume expansion, but in other cases it is desirable to use additional blowing agents such as Freon or methylene chloride to further reduce the density of the foam product. The various types of spraying and mixing machinery as well as the commonly used blowing agents are well known to those experienced in the production of conventional polyurethane foams.

TEST PROCEDURES

Oxygen Index values were obtained using the technique outlined in ASTM D2863-77.

Smoke values were obtained by the method described in ASTM E 662-79. The specific smoke densities at 90 seconds, at 4 minutes and the maximum values are reported.

Toxicity values are time to death values as described by C. J. Hilado in *Modern Plastics,* 54, p. 64, July 1977.

Compression set values were obtained by using the technique outlined in ASTM D3574-77, Test D.

Having described the basic aspects of our invention, the following examples are given to illustrate specific embodiments thereof.

COMPARISON EXAMPLE 1

A prepolymer was prepared by slowly adding a polyol mixture heated to 40° C. of three moles of polyethylene glycol having a molecular weight of 1000 and one mole of trimethylolpropane to an isocyanate phase which was also heated to 40° C. of 8.28 moles of a commercial 80/20 mixture of 2,4 and 2,6 tolylene diisocyanate. Care was taken to conduct the reaction under anhydrous conditions. The addition was conducted during a one hour period. Since it was exothermic cooling was necessary to maintain the reaction temperature desirably within the range between 50° and 60° C. The prepolymer was stirred for an additional four hours after which the isocyanate content was 1.62 meq/g. and the prepolymer had a viscosity at 25° C. of 33,000 cp.

COMPARISON EXAMPLE 2

The same procedure of Example 1 was followed except the polyol phase consisted of (a) two moles of polyethylene glycol having a molecular weight of 1000 and (b) one mole of trimethylolpropane while the isocyanate phase contained nine moles of 4,4'diphenylmethane diisocyanate (i.e. MDI sold by Upjohn under the tradename of Isonate 125M). The prepolymer prepared contained 1.68 meq. NCO/g and had a viscosity at 25° C. of 272,000 cps. A foam was prepared from this prepolymer by adding this prepolymer to an equal amount of water in the presence of 0.5 phr of Pluronic F38 and 1.0 phr of Pluronic F88. The foam had a compression set value of greater than 30%. This formulation had no fire retardant additive which would, if added, cause the compression set value to be higher.

This example illustrates that just using unpolymerized MDI as the isocyanate source does not result in the desired flexible foam with a compression set value of about 20% or less.

COMPARISON EXAMPLE 3

The same procedure of Example 1 was followed except the polyol phase consisted of (a) 0.21 of a mole of polyethylene glycol having a molecular weight of 1000, (b) 0.2 mole of polyethylene glycol having a molecular weight of 1500 and (c) 0.67 mole of trimethylolpropane while the isocyanate phase contained 1.67 moles of a modified diphenylmethane diisocyanate containing a high percentage of pure diphenylmethane diisocyanate and a lesser amount of polycarbodiimide adducts (Isonate 143L by Upjohn Polymer Chemicals). The prepolymer prepared contained 2.48 meq NCO/g and had a viscosity at 25° C. of 21,000 cp. A foam made from this prepolymer with the aqueous formulation of comparison Example 2 had a compression set value of 45%.

This formulation had no fire retardant additive which would, if added, cause the compression set value to be higher.

This example illustrates again that just using an unpolymerized form of MDI as the isocyanate source does not result in the desired flexible foam with a compression set value of about 20% or less.

EXAMPLE 4

The same procedure of Example 1 was followed except the polyol phase consisted solely of 1 mole of polyethylene glycol having a molecular weight of 1000 and the isocyanate phase contained two moles of polymethylene polyphenyl isocyanate with a functionality of 2.3 and an equivalent wt. of 133 per isocyanate group. The prepolymer prepared had an NCO number of 1.63 and a viscosity at 15° C. of 45,000 cps. Care must be taken to prevent contact between this prepolymer and moisture to prevent loss of isocyanate content and consequent rise in viscosity.

EXAMPLE 5

The procedure of Example 1 was followed except the polyol phase consisted of 1 mole of polyethylene glycol having a molecular weight of 1000 and the isocyanate phase contained (a) 1.92 moles of a polymethylene polyphenyl isocyanate with a functionality of 2.3 and an equivalent weight of 133 and (b) 0.575 mole of a commercial 80/20 mixture of 2,4 and 2,6 tolylene diisocyanate. The prepolymer prepared contained 2.0 meq NCO/g and had at 26° C. a viscosity of 27,000 cps.

EXAMPLE 6

The procedure of Example 1 was followed except the polyol phase consisted of one half mole of polyethylene glycol having a molecular weight of 1000 and the isocyanate phase consisted of (a) one half mole of polymethylene polyphenyl isocyanate with a functionality of 2.3 and an equivalent wt. of 133 per isocyanate group and (b) 0.35 mole of 4,4' diphenylmethane diisocyanate. The prepolymer prepared contained 0.96 meq NCO/g and had a viscosity at 41° C. of 57,000 cps.

EXAMPLE 7

The procedure of Example 1 was followed except the polyol phase contained one-half mole of polyethylene glycol having a molecular weight of 1000 and the isocyanate phase contained (a) one-half mole of polymethylene polyphenyl isocyanate with a functionality of 2.2 and an equivalent molecular weight of 131 and (b) 0.35 mole of a polymethylene polyphenyl isocyanate with a functionality of 2.7 and an equivalent molecular weight of 133. The prepolymer prepared contained 1.29 meq of NCO per gram and had a viscosity of 286,000 cps at 32° C.

EXAMPLE 8

The procedure of Example 1 was followed except that the polyol phase contained (a) 0.034 mole of a polyethylene glycol having a molecular weight of 1000, (b) 0.2 mole of a polyethylene glycol having a molecular weight of 1500 and (c) 0.05 mole of 1,4-butanediol while the isocyanate phase contained 1.0 mole of a polymethylene polyphenyl isocyanate with a functionality of 2.2 and an equivalent wt. of 131 plus 0.25 moles of commercial 80/20 mixture of 2,4 and 2,6-tolylene diisocyanate. The prepolymer prepared contained 1.77 meq NCO per gram and had a viscosity at 55° C. of 48,000 cps.

EXAMPLE 9

The procedure of Example 1 was followed except the polyol phase contained (a) 0.4 mole of polyethylene glycol having a molecular weight of 1000, (b) 0.01 mole of polyethylene glycol having a molecular weight of 2,500 and (c) 0.4 mole of 1,4 butanediol while the isocyanate phase contained 1.2 moles of a polymethylene polyphenyl isocyanate with a functionality of 2.2 and an equivalent weight of 131. The prepolymer prepared contained 1.63 meq NCO per gram and had a viscosity at 25° C. of 238,000 cps.

EXAMPLE 10

The same procedure of Example 1 was followed except the polyol phase contained (a) 0.1 mole of polyethylene glycol having a molecular weight of 1,000, (b) 0.2 mole of polyethylene glycol having a molecular weight of 1,500 and (c) 0.07 mole of trimethylolpropane while the isocyanate phase contained 0.85 mole of polymethylene polyphenyl isocyanate with a functionality of 2.2 and an equivalent molecular weight of 131 per isocyanate group. The prepolymer prepared had an isocyanate content of 1.48 meq NCO/g and a viscosity at 25° C. of 347,000 cp.

EXAMPLE 11

The same procedure of Example 1 was followed except the polyol phase contained (a) 0.2 mole of polyethylene glycol having a molecular weight of 1,500 and (b) 0.1 mole of a triol made by adding ethylene oxide to glycerine until a product having a molecular weight of 1,000 was obtained while the isocyanate phase contained 0.1 mole of a polymethylene polyphenyl isocyanate with a functionality of 2.2 and an equivalent molecular weight of 131 per isocyanate group. The prepolymer prepared had an isocyanate content of 2.17 meq NCO/g.

EXAMPLE 12

The same procedure of Example 1 was followed except the polyol phase consisted of (a) 0.2 mole of a diol having a molecular weight of approximately 1700 which contained 70% polyoxypropylene units and 30% polyxoyethylene units, (b) 0.23 mole of a polyethylene glycol having a molecular weight of 400 and (c) 0.04 mole of butanediol while the isocyanate phase contained 0.95 mole of a polymethylene polyphenol isocyanate with a functionality of 2.2 and an equivalent molecular weight of 131 per isocyanate group. The prepolymer prepared contained 1.54 meq NCO/g and had a viscosity at 25° C. of 400,000 cp.

EXAMPLE 13

A flexible foam was prepared by mixing rapidly and intimately a prepolymer phase an an aqueous phase. The prepolymer phase contained 100 parts of the prepolymer described in Example 1 and 10 parts of Freon F-11 (du Pont). The aqueous phase contained:

| component | parts per 100 parts resin (phr) |
|---|---|
| water | 100 |
| Brij 72 | 0.5 |
| Pluronic P-75 (BASF-Wyandotte) | 0.5 |

-continued

| component | parts per 100 parts resin (phr) |
|---|---|
| Foley Fluff (Buckeye Cellulose) | 4.0 |
| Phoschek P/30 (Monsanto) | 23 |
| Natrasol 250 HH (Hercules) | 0.3 |
| boric acid | 1 |
| $Al_2O_3 \cdot 3H_2O$ | 130 |

Within seconds of the mixing operation the mixture was poured into a mold and the foam rose within 5 to 10 minutes. The foam dried and cured under reduced pressure (ca. 2 psia) at 100° C. for 16 hours. The flammability, smoke generation, toxic gas generation and stability properties are summarized in Table 1.

TABLE 1

FOAM PROPERTIES

| Example No. | Prepolymer Example No. | Flamm OI (%) | Smoke Generation,[a] $D_s$ | | | Toxicity of Combustion Gases[b] Time to Death, Min. | % Compression Set | |
|---|---|---|---|---|---|---|---|---|
| | | | 90 Sec | 4 Min | Max | | Initial | After 3 Hrs Wet, 105° C. |
| 13 | 1 | 52 | 114 | 227 | 254 | 21.8 ± .24 | 34 | * |
| 14 | 1 | 55 | 55 | 103 | 119 | 20.5 ± .04 | 44 | * |
| 15 | 4 | 57 | 43 | 77 | 90 | — | 16 | 22 |
| 16 | 5 | 57 | 54 | 98 | 114 | 20.6 ± .9 | 30 | 22 |
| 17 | 6 | 64 | 31 | 57 | 69 | — | 16 | 34 |
| 18 | 7 | 64 | 37 | 64 | 78 | — | 15 | 12 |
| 19 | 8 | 61 | 38 | 62 | 71 | — | 22 | 12 |
| 20 | 9 | 64 | 41 | 78 | 92 | 23.9 ± 1 | 20 | 21 |
| 21 | 10 | | | | | | 13 | |
| 22 | 11 | | | | | | 15 | |

Footnotes:
[a]Specific smoke density ($D_s$) from flaming mode of NBS Smoke Chamber.
[b]Toxicity protocol from C. J. Hilado, Modern Plastics, 54 (7), 64, July 1977.
*Foam degraded - measurement of compression set not possible.

EXAMPLE 14

A flexible foam was prepared as described in Example 13 except the aqueous phase contained:

| component | parts per 100 parts resin (phr) |
|---|---|
| water | 115 |
| Pluronic L-32 (BASF-Wyandotte) | 0.75 |
| Pluronic P-75 (BASF-Wyandotte) | 1.5 |
| Foley Fluff (Buckeye Cellulose) | 4.0 |
| Phoschek P/30 (Monsanto) | 22 |
| Carbopol 941 (B. F. Goodrich) | 0.3 |
| boric acid | 6 |
| $Al_2O_3 \cdot 3H_2O$ | 185 |

The foam properties obtained are shown in Table 1.

EXAMPLES 15-22

In these examples a flexible foam was prepared following the procedure of Example 14 except the prepolymer used was the prepolymer obtained in Examples 4-11, respectively. The foam properties are shown in Table 1.

When using the same polyol, a comparison between Example 16 and Examples 17 and 18 shows a much better compression set value is obtained when using polymeric MDI (Examples 17 and 18) as the isocyanate as compared to TDI (Example 16).

EXAMPLE 23

A foam was prepared by adding the prepolymer of Example 12 to an equal amount of water in the presence of 0.5 phr of Pluronic F38 and 1.0 phr of Pluronic F88. The foam had a compression set of 4%.

DISCUSSION OF THE EXAMPLES

The fire retardant foams according to the present invention which are made from prepolymers containing polymeric MDI have superior properties compared to the foams made from prepolymers containing TDI as the isocyanate source. For flame retardancy as measured by the Oxygen Index standard, the TDI containing foam of Example 14 which is made from a polyethylene glycol having a molecular weight of 1,000 (PEG 1000) has an OI value of 55 whereas the MDI foams of Examples 17 and 18 which are also made from PEG 1,000 have higher OI values of 64.

Similar superiority is shown by the lower smoke generation values. The TDI foam of Example 14 after 90 seconds has a $D_s$ value of 55 compared to the lower values of 31 and 37 for the MDI foams of Examples 17 and 18 respectively. After 4 minutes the TDI foam has a $D_s$ value of 103 while the MDI foams have only 57 and 64. At the maximum values, the TDI foam value of 119 is substantially larger than the MDI foam values of 69 and 78 from Examples 17 and 18.

Although all of the foams have not been subjected to animal toxicity testing, a comparison of Examples 14 and 20 again shows the superiority of the present foams in this area. The TDI containing foam of Example 14 has a time to death of 20.5±0.4 minutes for the combustion gas whereas the combustion gas from the MDI foam of Example 20 is less toxic since it takes a longer period of 23.9±1 minutes to achieve death.

The superior compression set is again seen by comparing the foams of Example 14 with Examples 17 and 18. The TDI containing foam of Example 14 has a large compression set value of 44 compared to the much smaller values of 16 and 15 for the MDI foams of Examples 17 and 18. As to the hydrolytic stability, the TDI foam of Example 14 broke apart under the wet test conditions and was completely unacceptable. The MDI foam of the present invention in Example 18, however, had a value of 12 which illustrates its good hydrolytic stability.

It is understood that the foregoing detailed description is given merely by way of illustration and that many variations may be made therein without departing from the spirit of this invention.

We claim:

1. A flexible foam having low compression set values of about 25% or less and good hydrolytic stability made by mixing together and reacting an aqueous phase and a resin phase comprising a prepolymer derived from
    (a) a diphenylmethane diisocyanate-containing isocyanate product with a functionality of greater than 2.0 comprising a mixture of diphenylmethane diisocyanate and polymethylene polyphenyl isocyanate, and
    (b) a polyol having at least about 50% by weight of oxyethylene groups and having nominally two to three hydroxyl equivalents per mole,
    the ratio of the isocyanate equivalents to the total hydroxyl equivalents being in the range of 1.5:1 to 5:1.

2. A flexible foam according to claim 1, wherein the polyol is a diol having a molecular weight of from about 200 to 6,000.

3. A flexible foam according to claim 2, wherein the diol has a molecular weight of from about 400 to 4,500.

4. A flexible foam according to claim 1, wherein the polyol comprises a mixture of at least two diols each having a molecular weight of from about 200 to 6,000.

5. A flexible foam according to claim 1, wherein the polyol is a triol with a molecular weight of about 1,000 to 6,000.

6. A flexible foam according to claim 1, wherein the polyol is a mixture containing at least one diol and at least one triol.

7. A flexible foam according to claim 1, wherein the compression set value is about 20% or less.

8. A flexible foam according to claim 1, wherein the aqueous phase and/or resin phase further contains fire retardant materials.

9. A flexible foam according to claim 1, wherein the isocyanate product has a functionality of about 2.2.

10. A prepolymer capable of reacting with water to form a flexible foam having low compression set values and good hydrolytic stability, said prepolymer made by reacting together
    (a) a diphenylmethane diisocyanate-containing isocyanate product with a functionality of greater than 2.0 comprising a mixture of diphenylmethane diisocyanate and polymethylene polyphenyl isocyanate, and
    (b) a polyol having at least about 50% by weight of oxyethylene groups and having nominally two to three hydroxyl equivalents per mole,
    the ratio of the isocyanate equivalents to the total hydroxyl equivalents being in the range of 1.5:1 to 5:1.

11. A prepolymer according to claim 10, wherein the polyol is at least one diol having a molecular weight of from about 200 to 6,000.

12. A prepolymer according to claim 11, wherein the diol has a molecular weight of from about 400 to 4,500.

13. A prepolymer according to claim 10, wherein the polyol comprises a mixture of at least two diols each having a molecular weight of from about 200 to 6,000.

14. A prepolymer according to claim 10, wherein the polyol is a triol with a molecular weight of about 1,000 to 6,000.

15. A prepolymer according to claim 10, wherein the polyol is a mixture containing at least one diol and at least one triol.

16. A prepolymer according to claim 10, wherein the isocyanate product has a functionality of about 2.2.

17. A method of making a flexible foam having low compression set values of about 25% or less and good hydrolytic stability comprising mixing together and reacting an aqueous phase and
    a resin phase comprising a prepolymer derived from
    (a) a diphenylmethane diisocyanate-containing isocyanate product with a functionality of greater than 2.0 comprising a mixture of diphenylmethane diisocyanate and polymethylene polyphenyl isocyanate, and
    (b) a polyol having at least about 50% by weight of oxyethylene groups and having nominally two to three hydroxyl equivalents per mole,
    the ratio of the isocyanate equivalents to the total hydroxyl equivalents being in the range of 1.5:1 to 5:1.

18. A method of making a flexible foam according to claim 17, wherein the polyol is a diol having a molecular weight of from about 200 to 6,000.

19. A method of making a flexible foam according to claim 18, wherein the diol has a molecular weight of from about 400 to 4,500.

20. A method of making a flexible foam according to claim 17, wherein the polyol comprises a mixture of at least two diols each having a molecular weight of from about 200 to 6,000.

21. A method of making a flexible foam according to claim 17, wherein the polyol is a triol with a molecular weight of about 1,000 to 6,000.

22. A method of making a flexible foam according to claim 17, wherein the polyol is a mixture containing at least one diol and at least one triol.

23. A method of making a flexible foam according to claim 17, wherein the isocyanate product has a functionality of about 2.2.

24. A method of making a flexible foam according to claim 17, wherein the compression set value is about 20% or less.

25. A method of making a flexible foam according to claim 17, wherein the aqueous phase further contains fire retardant materials.

* * * * *